US012762540B2

(12) United States Patent
Subramanian et al.

(10) Patent No.: US 12,762,540 B2
(45) Date of Patent: *Oct. 13, 2026

(54) UNIFIED LOGIN ACROSS APPLICATIONS

(71) Applicant: PAYPAL, INC., San Jose, CA (US)

(72) Inventors: Velayutham Subramanian, San Jose, CA (US); Narendra Kamesh, San Jose, CA (US); Arpan Nanavati, San Jose, CA (US); Brent Walter, San Jose, CA (US); Aravindan Ranganathan, San Jose, CA (US); Bill Scott, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/603,873

(22) Filed: Mar. 13, 2024

(65) Prior Publication Data

US 2024/0346489 A1 Oct. 17, 2024

Related U.S. Application Data

(63) Continuation of application No. 14/855,152, filed on Sep. 15, 2015, now Pat. No. 11,954,671.
(Continued)

(51) Int. Cl.
*G06Q 20/36* (2012.01)
*G06F 21/33* (2013.01)
(Continued)

(52) U.S. Cl.
CPC ....... *G06Q 20/3674* (2013.01); *G06F 21/335* (2013.01); *G06Q 20/326* (2020.05);
(Continued)

(58) Field of Classification Search
CPC .......... G06Q 20/40; H04L 63/08; G06F 21/41
See application file for complete search history.

(56) References Cited

U.S. PATENT DOCUMENTS

| | | | | |
|---|---|---|---|---|
| 5,991,750 | A | 11/1999 | Watson | |
| 8,540,151 | B1 * | 9/2013 | Snyder | G06Q 20/24 705/40 |

(Continued)

FOREIGN PATENT DOCUMENTS

| | | | |
|---|---|---|---|
| CN | 1812403 | A | 8/2006 |
| CN | 1929376 | A | 3/2007 |

(Continued)

OTHER PUBLICATIONS

Extended European Search Report for European Application No. 15891019, mailed on Aug. 28, 2018, 6 pages.

(Continued)

*Primary Examiner* — Patrick Mcatee
*Assistant Examiner* — Sima Asgari
(74) *Attorney, Agent, or Firm* — HAYNES AND BOONE, LLP

(57) ABSTRACT

A system and/or method may be provided to silently authenticate a user. An example method of silently authenticating a user includes receiving a request to complete a transaction associated with a merchant application. The request includes a data file including an identifier from the user device. The request is from a user device. The method also includes determining whether the data file includes a refresh token and determining whether the refresh token is valid if the data file includes the refresh token. The method further includes receiving an access token from the user device if the refresh token is valid. The access token includes an authorization scope. The method also includes determining whether the transaction is within the authorization scope. The method further includes authenticating a user if the transaction is within the authorization scope.

20 Claims, 14 Drawing Sheets

Related U.S. Application Data

(60) Provisional application No. 62/153,485, filed on Apr. 27, 2015.

(51) Int. Cl.

| | |
|---|---|
| ***G06Q 20/32*** | (2012.01) |
| ***G06Q 20/38*** | (2012.01) |
| ***G06Q 20/40*** | (2012.01) |

(52) U.S. Cl.
CPC ......... *G06Q 20/36* (2013.01); *G06Q 20/3821* (2013.01); *G06Q 20/4014* (2013.01); *G06F 2221/2139* (2013.01); *G06Q 2220/00* (2013.01)

(56) References Cited

U.S. PATENT DOCUMENTS

| | | | | |
|---|---|---|---|---|
| 8,832,787 | B1 * | 9/2014 | Sanin | H04L 63/0815 726/2 |
| 2002/0138728 | A1 * | 9/2002 | Parfenov | H04L 63/0823 713/153 |
| 2004/0002878 | A1 | 1/2004 | Maria Hinton | |
| 2004/0098313 | A1 | 5/2004 | Agrawal | |
| 2005/0262026 | A1 | 11/2005 | Watkins | |
| 2007/0234410 | A1 | 10/2007 | Geller | |
| 2011/0119732 | A1 * | 5/2011 | Dunn | H04L 63/102 726/1 |
| 2012/0030047 | A1 * | 2/2012 | Fuentes | G06Q 20/326 705/26.1 |
| 2013/0086645 | A1 | 4/2013 | Srinivasan | |
| 2014/0020070 | A1 | 1/2014 | Angal | |
| 2014/0075513 | A1 | 3/2014 | Trammel | |
| 2014/0230020 | A1 | 8/2014 | Mogaki | |
| 2014/0359702 | A1 * | 12/2014 | Mihara | G06F 21/31 726/3 |
| 2014/0380428 | A1 * | 12/2014 | Kobayashi | G06F 21/335 726/4 |
| 2015/0039444 | A1 | 2/2015 | Hardin | |
| 2015/0121462 | A1 * | 4/2015 | Courage | H04L 63/102 726/4 |
| 2015/0180857 | A1 * | 6/2015 | Schulman | H04L 63/08 726/9 |
| 2015/0271739 | A1 * | 9/2015 | Numakami | H04W 12/08 370/315 |
| 2016/0092874 | A1 | 3/2016 | O'Regan | |

FOREIGN PATENT DOCUMENTS

| | | | |
|---|---|---|---|
| CN | 102939613 | A | 2/2013 |
| CN | 103765454 | A | 4/2014 |
| CN | 103986688 | A | 8/2014 |
| CN | 104255007 | A | 12/2014 |
| CN | 104301316 | A | 1/2015 |
| CN | 104378376 | A | 2/2015 |
| EP | 2665024 | A1 | 11/2013 |

OTHER PUBLICATIONS

Hardt D., "RFC 6749 the OAuth 2.0 Authorization Framework", Oct. 31, 2012, pp. 1-76, XP055218558, Retrieved from the Internet: URL: https://www.rfc-editor.org/rfc/pdfrfc/rfc6749.pdf, 76 pages.

International Preliminary Report on Patentability for Application No. PCT/US2015/063275, mailed on Nov. 9, 2017, 5 pages.

International Search Report and Written Opinion for Application No. PCT/US2015/063275, mailed on Feb. 12, 2016, 5 pages.

D. Hardt, "RFC 6749 the OAuth 2.0 Authorization Framework", Oct. 31, 2012, pp. 1-76, XP055218558, Retrieved from the Internet: http:/h.•tNN.rfc-editor.org/rtc/pdfric./rfc67 49.txt.pdf (retrieved on Oct. 6, 2015).

* cited by examiner

UNIFIED LOGIN ACROSS APPLICATIONS

CROSS-REFERENCE TO RELATED APPLICATIONS

The present application is a Continuation of U.S. patent application Ser. No. 14/855,152 filed on Sep. 15, 2015, and entitled "Unified Login Across Applications", which claims benefit to Provisional U.S. Patent Application No. 62/153,485 filed Apr. 27, 2015 and entitled "Systems and Methods for Unified Login Across Applications", the disclosures of each which have been hereby incorporated by reference in their respective entireties.

BACKGROUND

Field of the Invention

The present disclosure generally relates to systems and methods for providing a unified login across applications.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal®, Inc. of San Jose, CA. Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. An online or mobile payment process utilizing the payment application typically includes user authentication that requires a user to enter a login identifier (ID) and/or a password to authenticate the user. Nevertheless, the authentication process may cause inconvenience to the user especially if the user is in a hurry or if a keyboard is not included with the mobile device for the user to type in the login ID or password. As such, the authentication process may delay the overall payment process and cause the payment process to take longer than making a payment with cash, which can discourage the use of online or mobile payments. Therefore, there is a need for a system or a method that implements an easier authentication process on mobile devices.

Figure 1:
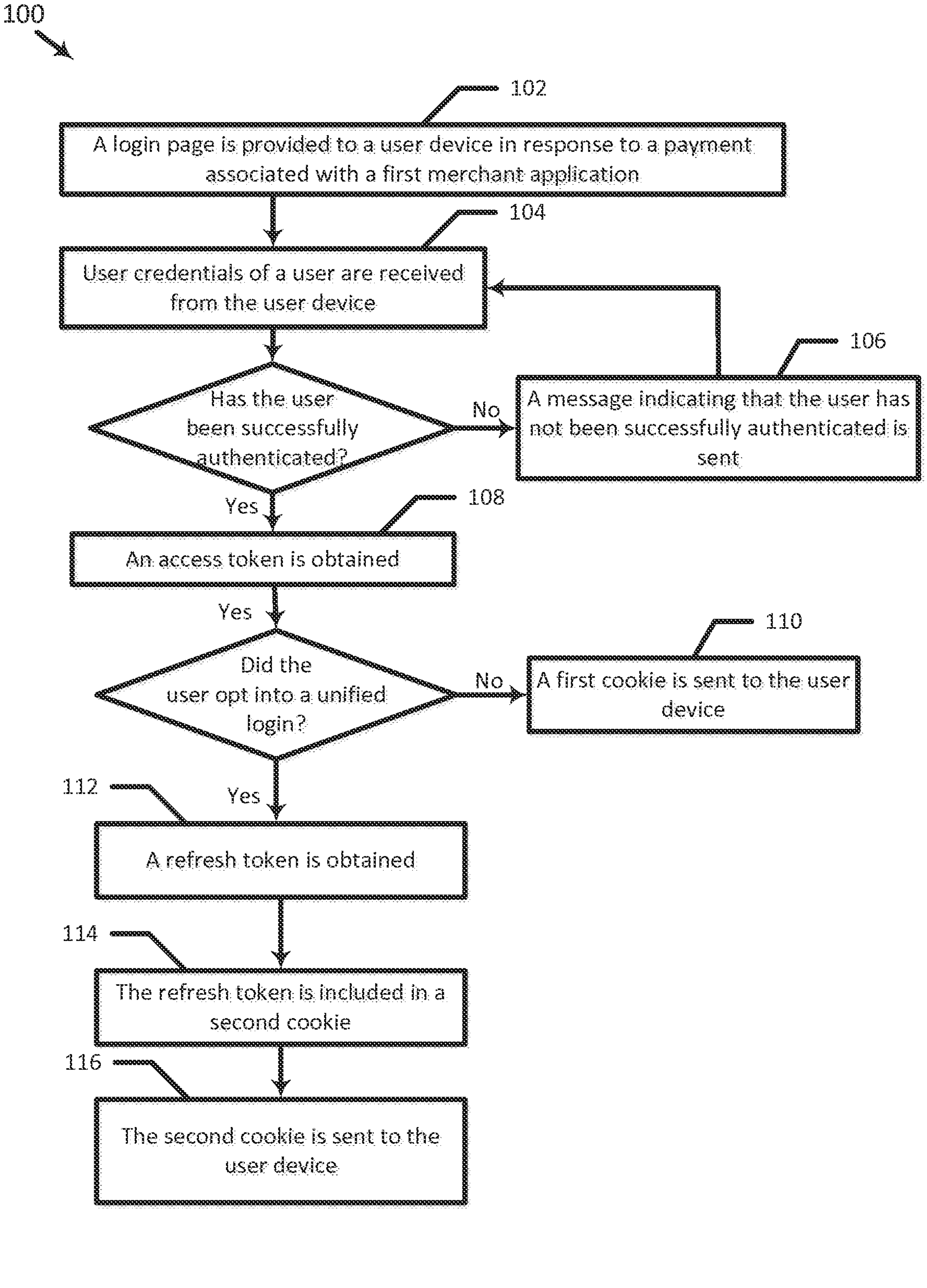
FIG. 1 is a flowchart illustrating an embodiment of a method of providing a refresh token to a user device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A merchant application provided on a user device may execute to identify products and/or services (e.g., collectively referred to as items) that are provided by the merchant and that may be made available for viewing and purchase by a user. The merchant may provide the user with the option to complete the purchase (or any transaction) using an account with a payment service provider. A payment provider server managed by the payment service provider may provide an authenticated login session to a user via the user device, and an authentication service may explicitly or silently (e.g., on the backend without requiring user input) authenticate the user to allow the user access to services provided by payment provider server. In an example, the payment provider server may request the user's user credentials and then ask whether the user would like to opt into a "universal" login or login across at least two different applications, platforms, or sites. If the user is successfully authenticated and opts into the universal login, the payment provider server provides the user device with a data file including a refresh token that the user device can use to authenticate themselves with the payment provider server. The data file may include an identifier that identifies the user device, and that the user device may send to the payment service provider to identify the user device.

Accordingly, if the user opts into the universal login and the user is subsequently on any merchant site that provides the user with the option to complete a transaction (e.g., pay) using the payment provider server, it may be unnecessary for the user to sign in and provide their user credentials. Rather, if the refresh token is still "alive" on that same user device (e.g., cookie has not yet expired and cookie's value is valid) and the transaction is within the authorization scope of the refresh token, the payment provider server silently authenticates the user. In this example, the payment provider server that is maintained by the payment service provider skips the request for a user login and subsequent receipt of user provided login information and instead authenticates the user without the user being prompted to enter their user credentials. As discussed in detail below, the payment provider server may request the user to opt into a universal login across multiple applications that allow the payment provider server to authenticate the user without requesting the user's login credentials. Accordingly, the user may perform transactions on different merchant apps or websites (that provide the user with the option to pay using an account the user has with the payment service provider) without having to re-login.

In some embodiments, a method may be provided to silently authenticate a user. An example method of silently authenticating a user includes receiving a request to complete a transaction associated with a merchant application. The request includes a cookie or device ID and is from a user device. The method also includes determining whether the cookie or device ID includes a refresh token and determining whether the refresh token is valid if the cookie includes the refresh token. The method further includes receiving an access token from the user device if the refresh token is valid. The access token includes an authorization scope of the transaction, information about the merchant, information about the user device, and/or time limits. The method also includes determining whether the transaction is within the authorization scope. The method further includes authenticating a user if the transaction is within the authorization scope.

Unless specifically stated otherwise, as apparent from the following discussion, it is appreciated that throughout the description, discussions utilizing terms such as "receiving", "sending", "storing", "providing", "generating," "determining", and "authenticating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

If the user enters their user credentials in order to be provided with an authenticated login session and the payment provider server authenticates the user based on the entered user credentials, the authentication may be referred to as an explicit authentication. If the user is authenticated based on a refresh token and without prompting the user in the current session for the user's user credentials, the authentication may be referred to as a silent authentication.

II. Consent to a Unified Login

A. Example Methods

FIG. 1 is a flowchart illustrating an embodiment of a method 100 of a payment service provider providing a user with an option to consent to a unified login. Method 100 is not meant to be limiting and may be used in other applications other than the payment applications discussed below. Method 100 includes blocks 102-116.

In a block 102, a login page is provided for display on a user device in response to a payment associated with a first merchant application. In some examples, a merchant application may also refer to a merchant's website or mobile app. The user may use a user device to access a merchant application and may desire to purchase one or more items or services provided by the merchant via the merchant application. In an example, the merchant application is a mobile application installed on the user device. In another example, the merchant application is a web application accessible via a unique resource locator (URL) to which a browser executing on the user device points.

Figure 2:
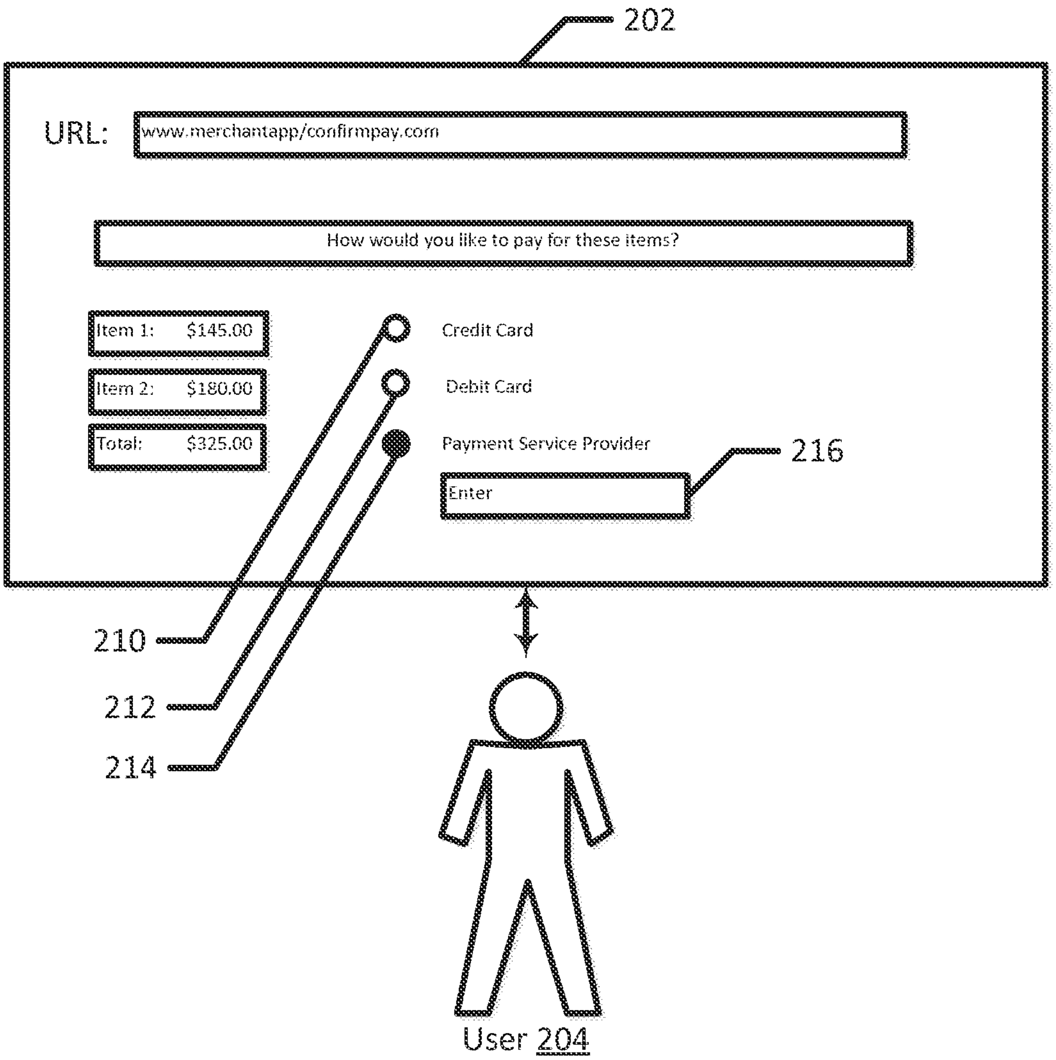
FIG. 2 is an example webpage that is provided by the merchant application to a user.

FIG. 2 is an example webpage 202 that is provided by the merchant application to a user 204. Webpage 202 is a webpage that is controlled by and provided by the merchant. Webpage 202 may be referenced by the URL "www.merchant.app/confirmpay.com" and includes the user's selected item(s) and/or service(s) along with the price and various ways for the user 204 to pay for those item(s) and/or service(s). For example, the merchant application may include in webpage 202 the option to pay with a credit card via user selectable object 210, debit card via user selectable object 212, or a user account the user has with a payment service provider via user selectable object 214. The user's user account with the payment service provider is linked to one or more methods of payment, which may include the user's credit card, debit card, bank account (e.g., checking account), and/or other forms of payment, etc. to which the user has given the payment provider server permission to access. The user may select one of these options by selecting the appropriate user selectable object and selecting a user selectable object 216, which is labeled "Enter." If user 204 selects user selectable object 210 to pay with a credit card, the merchant application requests user 204 to enter credit card information. If user 204 selects user selectable object 212 to pay with a debit card, the merchant application requests user 204 to enter debit card information.

If user 204 selects user selectable object 214 to pay with a payment account linked to the user's payment service provider user account, the merchant application may redirect the user device to the payment provider server.

In an example, merchant application passes control to an associated Software Development Kit (SDK) provided by the payment service provider. An SDK includes a set of tools and platform components (e.g., set of software libraries) for developers to develop, build, test, debug, and optimize their applications, and manage the platform component installation. The SDK may also provide easy ways to integrate with the build and development environments. In an example, the SDK is Paypal Touch®, available from PayPal® Inc., of San Jose, CA, and the payment service provider is PayPal®, Inc. of San Jose, CA. However, a variety of entities may provide the SDK and operate as the payment service provider (or other system provider) while remaining within the scope of the present disclosure.

In an example, the SDK is incorporated into the merchant application. In another example, the SDK is a service that is called by the merchant application. In response to the user selecting user selectable object 214, the merchant application points to or causes a browser executing on the user device to point to a URL that references resources stored at a payment provider server. The payment provider server is associated with the payment service provider and may be controlled by the payment service provider.

An SDK may be provided by a payment service provider to the merchant that maintains the merchant application. The merchant may incorporate the SDK into the merchant application during the building of the application. In an example, if a user downloads the merchant application on a user device, the SDK may also be downloaded with (or as part of) the merchant application on the user device. As such, when the user selects the merchant application by, for example, selecting an icon associated with the merchant application, the merchant application (along with the SDK) is launched. In another example, the SDK may be part of an application that is trusted by the payment provider server and that interacts with the merchant application on the user device. In such an example, the user may download the SDK independent of the merchant application and provide it on the user device.

The SDK communicates with a payment provider server operated by the payment service provider and sends information to and receives information from the payment provider server. In an example, the SDK and the payment provider server may communicate with each other to authenticate the user. The user device may include a plurality of merchant applications, each of which may incorporate the SDK from the payment service provider.

The merchant application (or SDK) passes payment details of the transaction (e.g., item(s) and/or service(s) purchased and total amount of transaction), identifying information about the client (e.g., an identifier that identifies the merchant's application), one or more redirect URLs, and/or a scope of the transaction to the payment provider server. A redirect URL may pass control from one resource or entity (e.g., the payment provider server) to another resource or entity (e.g., the merchant application). A scope of the transaction specifies the permissions associated with the transaction. In an example, the SDK passes a payment object including payment details of the transaction, identifying information about the client, one or more redirect URLs, and/or a scope of the transaction to the payment provider server. The SDK may pass the payment object to the payment provider server directly or via the browser. In an example, the SDK invokes an application programming interface (API) at the payment provider server to pass the payment object to the payment provider server.

Before the payment provider server allows the user to access resources protected by the payment provider server, it may prompt the user for their user credentials. In an example, the payment provider server sends a login page to the user device for display, and the login page prompts the user to enter their user credentials into the user device.

Figure 3A:
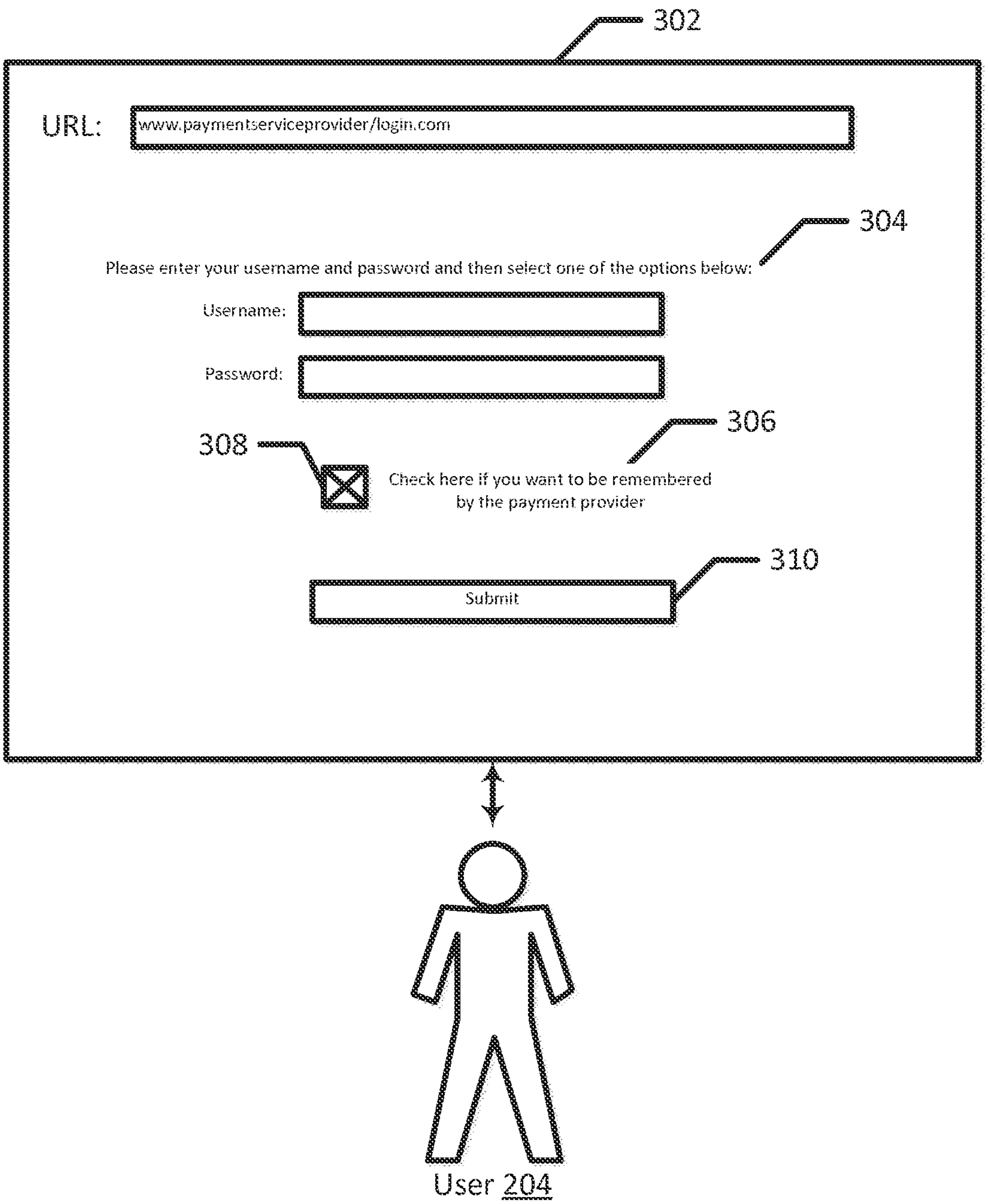
FIGS. 3A and 3B are example webpages that are provided by the payment provider server to the user.

FIG. 3A is an example login webpage 302 that is provided by the payment provider server to user 204. The payment provider server may provide webpage 302 in response to the user selecting user selectable object 214 to pay with the user's payment account linked to the user's payment service provider user account. Webpage 302 is referenced by the URL "www.paymentserviceprovider/login.com" and is controlled by and provided by the payment provider server. Accordingly, the SDK (or browser executing on the user device) may redirect the user device from a webpage hosted by the merchant's server (see FIG. 2) to a webpage hosted by the payment provider server.

In an example, a unified login server provides webpage 302 to a user device for display on the user device. Webpage 302 is a login page including a prompt 304 that requests the user to enter their user credentials (e.g., a username and password) in order for the payment provider server to authenticate the user. The payment provider server may include an authentication service that receives the user's user credentials and determines, based on the entered user credentials, whether the user has been successfully authenticated. In an example, the payment provider server makes a call to/v 1/OAuth/login in order to effectively login the user and obtain an access token. Parameters of the call may include the user's user or login credentials.

Webpage 302 also includes a prompt 306 that requests the user to check or otherwise select user selectable object 308 if the user wishes to be "remembered" by the payment provider server. If user 204 selects user selectable object 308, user 204 opts into a unified login that allows the payment provider server to silently authenticate the user the next time the user device attempts to access resources or services stored at the payment provider server.

If the user has been successfully authenticated, a secure token service generates an access token and provides it to the user device. The secure token service may drive the assessment of cookies (e.g., refresh tokens, etc.) to determine whether they are sufficient for a login. The secure token service may provide an inspection and validation of the cookies based on policies and the risk in allowing the login. An access token is a data object by which a client authenticates to a resource server (e.g., payment provider server) and lays claim to authorizations for accessing particular resources. For example, the user device may use an access token generated by the payment provider server to access a resource (e.g., user account and payment account information) protected by the payment provider server. The access token may have a specific authorization scope and duration. The authorization scope may depend on such factors as whether the user has provided their user credentials for authentication or is silently authenticated.

Figure 3B:
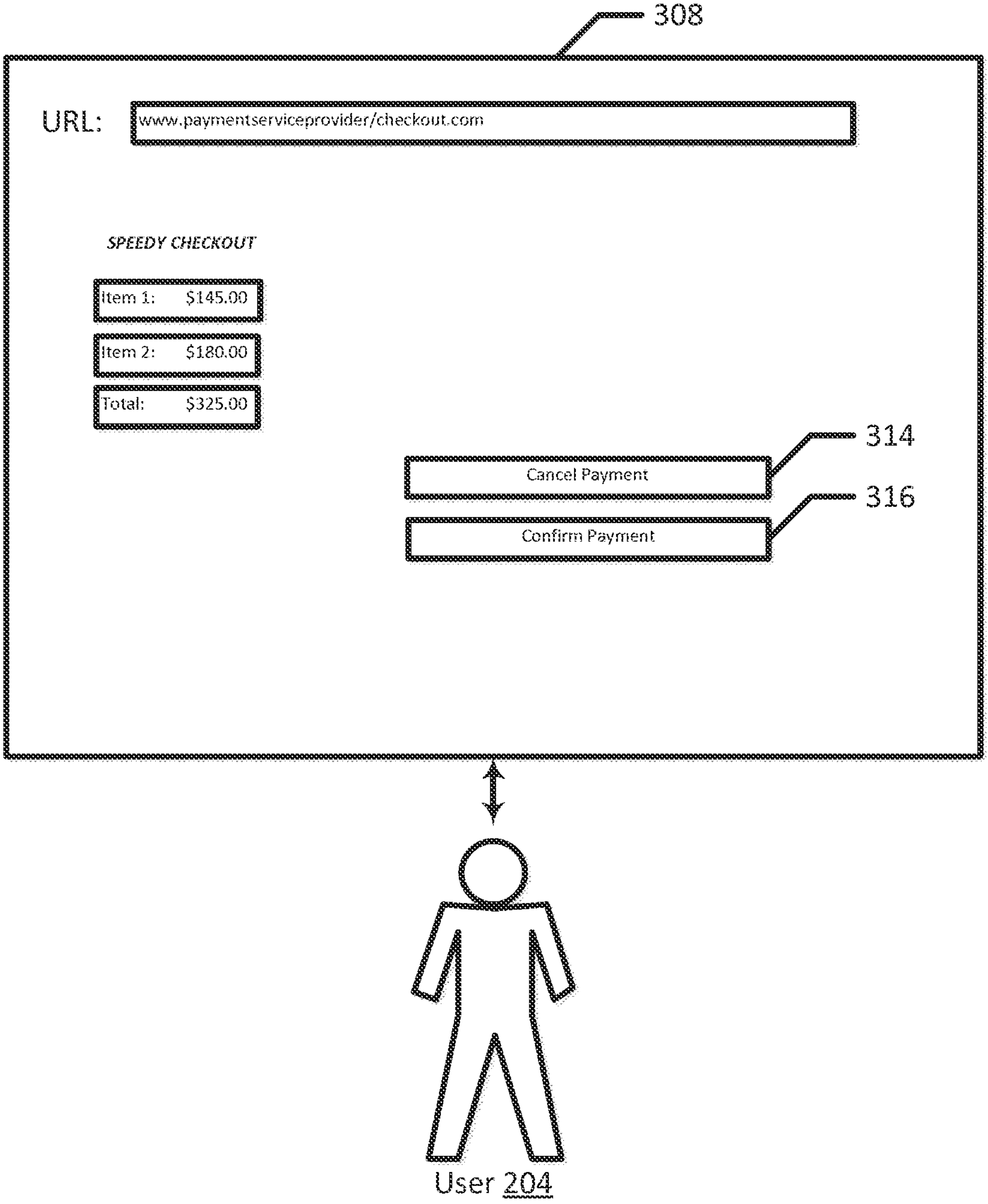

The payment provider server may provide the user device with an authenticated session. In an example, the payment provider server provides a checkout webpage to the user device. FIG. 3B is an example checkout webpage 308 that is provided by the payment provider server to user 204. By viewing webpage 308, user 204 may review the information associated with the transaction (e.g., payment) and confirm the transaction. The payment provider server redirects the user device back to the merchant application or website.

In contrast, if user 204 does not select user selectable object 308, the payment service provider will not "remember" user 204, and thus user 204 will continue to be prompted to login each time (e.g., in webpage 302). In this example, in order to be authenticated and thus obtain an access token from the payment provider server to access its resources, user 204 enters their user credentials.

If the user 204 selected user selectable object 308, the payment provider server provides the user device with a refresh token that may be used to keep user 204 logged into the payment provider service system. In an example, the payment provider server generates a refresh token and provides the user device with a "Remember Me" cookie that includes the refresh token. The cookie may have an expiration date (e.g., 60 days from the date of issuance). As will be discussed further below, as long as the cookie has not yet expired, user 204 may perform other transactions (e.g., payments via the payment provider server) without having to login and provide their user credentials. A cookie is a small text file that allows a website or web application to recognize a particular user and their interaction with the merchant application.

The user device may receive the cookie and store the cookie including the refresh token in browser memory. The refresh token keeps the user "alive" and logged into the payment provider server across refreshes and across webpages as long as the cookie has not expired yet and the transaction that is being attempted by the user (e.g., payment) is within the scope associated with the refresh token. The cookie that is placed in browser memory allows a secure token service to determine scenarios where a full login (e.g., entering user credentials) can be skipped.

The payment provider server stores the refresh token for subsequent presentation of the cookie by the user. Accordingly, the next time user 204 wants to purchase item(s) or service(s) from any merchant that allows users to pay via the payment service provider, the browser executing on the user device may send the cookie including the refresh token to the payment provider server in order for the payment provider server to silently authenticate user 204.

Referring back to FIG. 1, in a block 104, user credentials of a user are received from the user device. In a block 106, if the user has not been successfully authenticated based on the user credentials, a message indicating that the user has not been successfully authenticated is sent. In an example, the payment provider server may send this message to a display of the user device so that the user may enter their user credentials again. In a block 108, if the user has been successfully authenticated, an access token is obtained. In an example, the secure token service generates the access token and provides it to the user device. The user device may use the access token to access resources provided by the payment provider server.

In a block 110, if the user has been successfully authenticated but did not opt into a unified login, a first cookie is sent to the user device. In this example, the first cookie does not include a refresh token.

In a block 112, if the user has been successfully authenticated and opted into the unified login, a refresh token is obtained. In an example, the unified login server generates refresh tokens. A refresh token allows the user device to obtain fresh access tokens from the payment provider server (e.g., secure token service) without having to enter user credentials. As such, it may be unnecessary for the user to enter user credentials in order to obtain an access token and thus access resources provided by the payment provider server. The unified login server may also save the user credentials in a database for later retrieval. From block 112, process flow proceeds to a block 114, in which the refresh token is included in a second cookie. From block 114, process flow proceeds to a block 116, in which the second cookie is sent to the user device.

It should be understood that additional processes may be performed before, during, or after blocks 102-116 discussed above. It is also understood that one or more of the blocks of method 100 described herein may be omitted, combined, or performed in a different sequence as desired. For example, in some examples, block 108 is removed from method 100.

Figure 4:
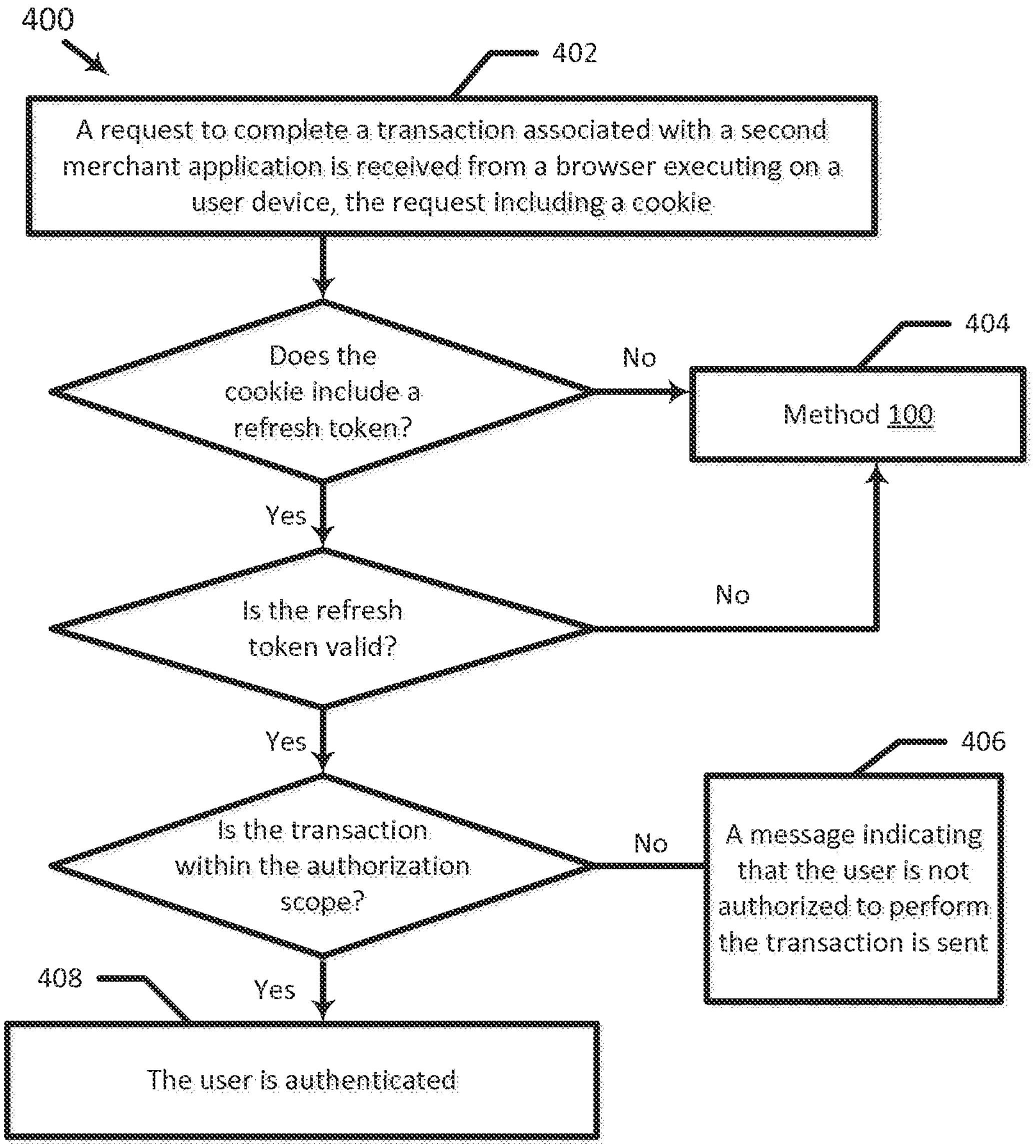
FIG. 4 is a flowchart illustrating an embodiment of a method of a payment service provider silently authenticating the user in association with a refresh token.

FIG. 4 is a flowchart illustrating an embodiment of a method 400 of a payment service provider silently authenticating the user in association with a refresh token. Method 400 is not meant to be limiting and may be used in other applications other than the payment applications discussed below. Method 400 includes blocks 402-408.

In a block 402, a request to complete a transaction associated with a second merchant application is received from a browser executing on a user device, the request including a cookie. The first merchant associated with method 100 may be the same or different from the second merchant associated with method 400. The merchant application(s) in method 100 and method 400 provide the user the option of completing a transaction (e.g., payment) using an account the user has with the payment provider server.

In a block 404, if the cookie does not include a refresh token, process flow proceeds to method 100. Additionally, if the cookie includes a refresh token but the refresh token is no longer valid (e.g., the cookie associated with the refresh token has expired), process flow proceeds to block 404, in which method 100 is executed. Accordingly, the payment provider server may prompt user 204 to enter user credentials.

The refresh token or transaction may be associated with an authorization scope that specifies a set of capabilities that the user is authorized to perform. In an example, the authorization scope for the illustrated purchase on webpage 202 may allow the user permission to credit a payment account linked to the user's payment service provider account and transfer a monetary amount equal to the credit over to another entity (e.g., merchant). The authorization scope associated with the refresh token, however, may deny (or not allow) the user permission to perform a set of capabilities, which may include changing the credit card information linked to the user's payment service provider account, adding a mailing address, etc. The authorization scope of a transaction may also specify some actions that the user is not authorized to perform.

In a block 406, if the refresh token is valid but the transaction is not within the authorization scope, a message indicating that the user is not authorized to perform the transaction is sent. In an example, the payment provider server may send the message to the user device for display to the user. In some examples, if the user attempts to perform an action that is not within the set of allowed capabilities of the authorization scope, the payment provider server may send the user the message (see block 406) and may also proceed to method 100 to request the user to login by providing their user credentials. In this example, the user is not silently authenticated. Additional checks may be provided to ensure that the refresh token is valid. For example, the payment provider server may check whether the expiration date of the cookie associated with the refresh token has expired.

In a block 408, if the refresh token is valid and the transaction is within the authorization scope, the user is authenticated without any input from the user. In an example, the secure token service generates, based on the determination that the refresh token is valid and the transaction is within the authorization scope, the new access token. The new access token may have the same attached authorizations as the previous access token generated by payment provider server and sent to the user device. The user device may provide the new access token to the payment provider server. In this example, the payment provider server skips the login page (e.g., webpage 302 in FIG. 3A) and provides the user device with an authenticated session without requesting user credentials from the user. For example, the payment provider server may direct the user device to a checkout page (e.g., webpage 308 in FIG. 3B) and allow user 204 to cancel or confirm the payment without entering their user credentials.

It should be understood that additional processes may be performed before, during, or after blocks 402-408 discussed above. It is also understood that one or more of the blocks of method 400 described herein may be omitted, combined, or performed in a different sequence as desired.

B. Example System Diagrams and Process Flows

Figure 5A:
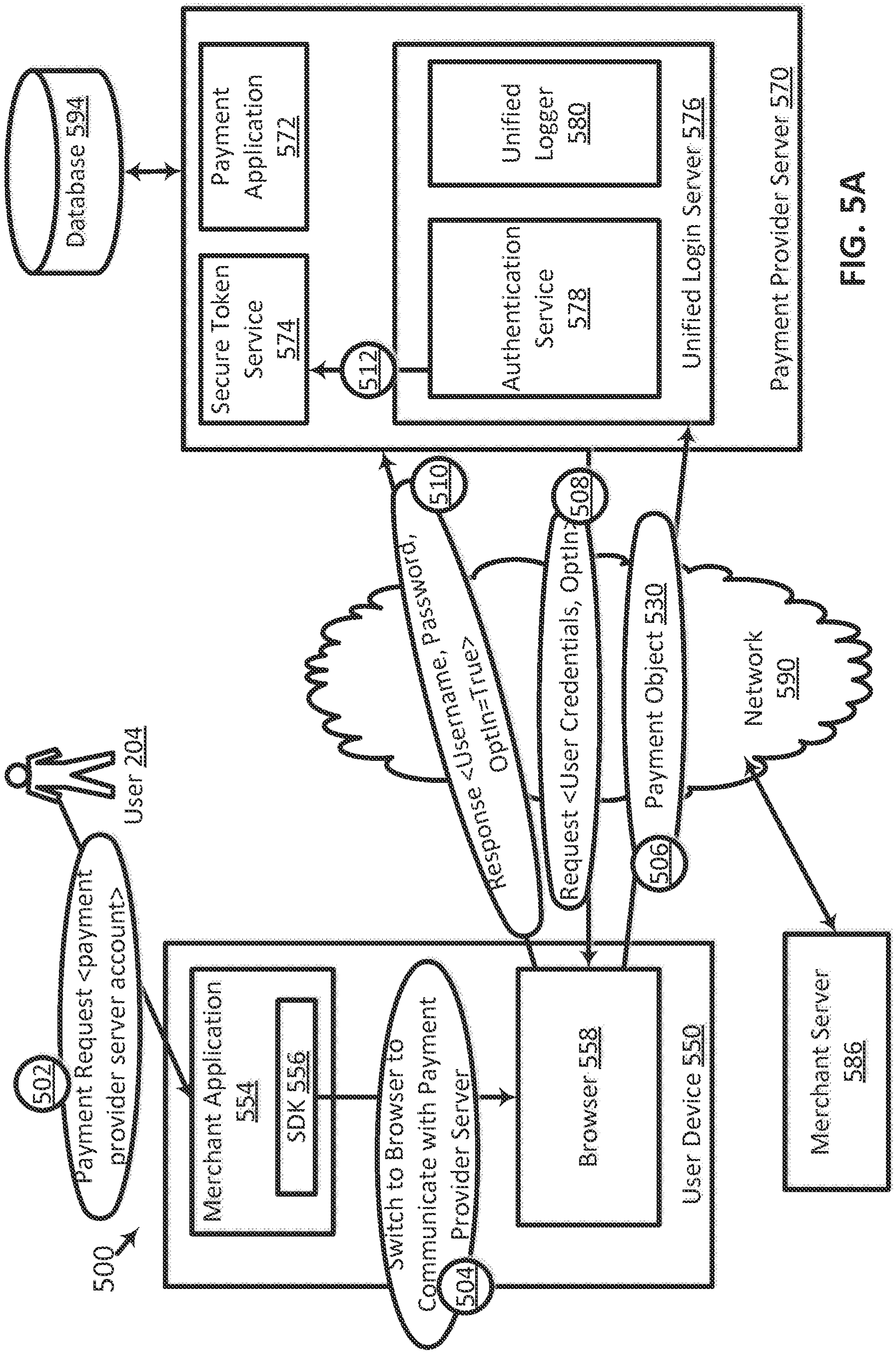
FIGS. 5A and 5B are block diagrams of an example process flow of a networked system configured to implement a process for silently authenticating a user using a computing device.
Figure 5B:
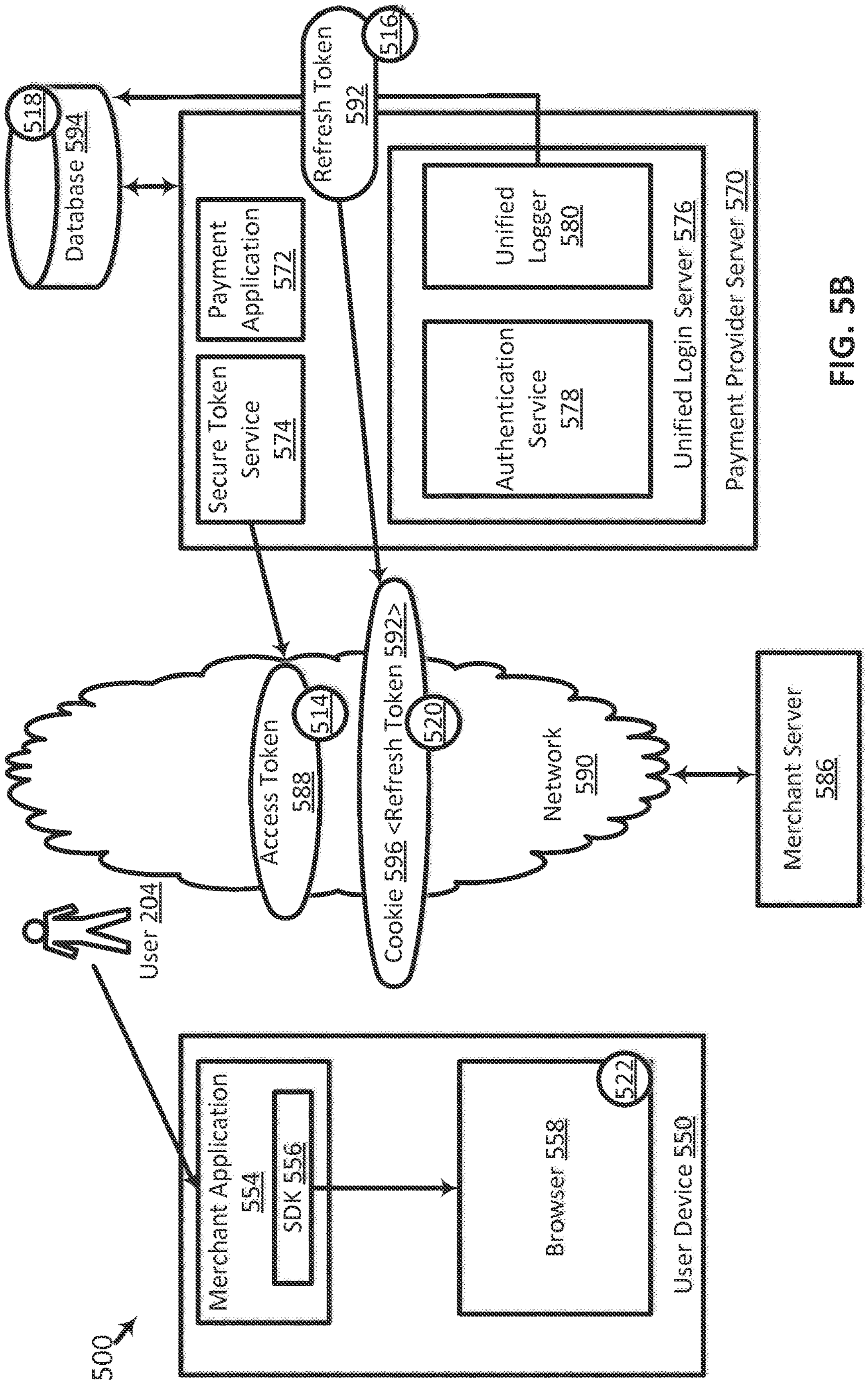

FIGS. 5A and 5B are block diagrams of an example process flow of a networked system 500 configured to implement a process for silently authenticating a user using a computing device. FIG. 5A is a block diagram of an embodiment of networked system 500 configured to implement a process for silently authenticating a user using a computing device. Networked system 500 may include or implement a plurality of servers and/or software components that operate to perform various payment transactions or processes. Exemplary servers may include, for example, stand-alone and enterprise-class servers operating a server operating system (OS) such as a MICROSOFT® OS, a UNIX® OS, a LINUX® OS, or other suitable server-based OS. It can be appreciated that the server(s) illustrated in FIG. 5A may be deployed in other ways and that the operations performed and/or the services provided by such a server may be combined or separated for a given implementation and may be performed by a greater number of servers. One or more servers may be operated and/or maintained by the same or different entities.

System 500 includes a user device 550, a payment provider server 570, and a merchant server 586 in communication over a network 590. Payment provider server 570 may be maintained by a payment service provider, such as PayPal®, Inc. of San Jose, CA. Merchant application 554 may be maintained, for example, by a merchant or seller offering various products and/or services. The merchant may be a participating merchant who has a merchant account with the payment service provider. Generally, merchant server 140 may be maintained by anyone or any entity that receives money, which includes charities as well as retailers and restaurants. For example, a purchase transaction may be a donation to charity.

User device 550, payment provider server 570, and merchant server 586 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 590.

Network 590 may be implemented as a single network or a combination of multiple networks. For example, in various embodiments, network 590 may include the Internet or one or more intranets, landline networks, wireless networks, and/or other appropriate types of networks. Payment provider server 570 may be referred to as a server that is remote from user device 550.

User device 550 may be implemented using any appropriate hardware and software configured for wired and/or wireless communication over network 590. For example, in one embodiment, the user device may be implemented as a personal computer (PC), a smart phone, wearable device, laptop computer, and/or other types of computing devices capable of transmitting and/or receiving data, such as an iPad™ from Apple™ or an Android smartphone. Trademarks are the property of their respective owners.

User 204 may be a consumer and may use user device 550 to perform an electronic transaction using payment provider server 570. In an example, user 204 uses user device 550 to initiate a payment transaction, receive a transaction approval request, and/or reply to the request. Note that transaction, as used herein, refers to any suitable action performed using the user device, including payments, transfer of information, display of information, etc.

In some examples, user device 550 is a mobile device (e.g., smartphone or computing tablet), and a user 204 downloads one or more mobile applications onto the mobile device. A mobile application may be a merchant application 554 that communicates with merchant server 586. In an example, user device 550 is an Android® device that is installed with the Android mobile operating system. A mobile application is a software program that may be downloaded and accessed directly via the mobile device. A mobile application may be represented by an icon on a display of user device 550, and user 204 may select the mobile application by touching the icon (e.g., double tapping the icon) to access and interact with the mobile application. In the example illustrated in FIG. 5A, merchant application 554 may be installed on user device 550. User 204 may have downloaded merchant application 554 on user device 550 or may have received this application already downloaded on user device 550. Merchant application 554 includes a software development kit (SDK) 506. In some examples, user device 550 is a desktop computer, and a user 204 points the browser executing on the desktop computer to merchant server 586 in order to retrieve webpages controlled by the merchant.

User device 550 also includes a browser 558. The user may browse merchant application 554 and desire to purchase item(s) or service(s) via the merchant application. In an example, user device 550 may include a browser that is used, for example, to provide a convenient interface to permit user 204 to browse information available over network 590. For example, in one embodiment, the browser application may be implemented as a web browser configured to view information available over the Internet, such as a user account for online shopping and/or merchant sites for viewing and purchasing goods and services. In another example, user device includes a toolbar application that is used, for example, to provide client-side processing for performing desired tasks in response to operations selected by user 204. In one embodiment, the toolbar application may display a user interface in connection with the browser application.

At an action 502, user 204 may select to make a payment using an account that the user has with payment provider server 570. At an action 504, in response to the selection in action 502, SDK 556 invokes an application switch to browser 558 to communicate with payment provider server 570. Payment provider server 570 may be maintained, for example, by an online payment service provider that provides payment between user 204 and the merchant that maintains merchant application 554. Payment provider server 570 may be configured to interact with user device 550 and/or a merchant that maintains merchant application 554 over network 590 to facilitate the purchase of goods or services, communicate/display information, and send payments by user 204 of user device 550 to a third-party (e.g., the merchant).

At an action 506, browser 558 sends a payment object 530 including payment details of the transaction, identifying information about the client, one or more redirect URLs, and/or a scope of the transaction to payment provider server 570. Payment provider server 570 includes a payment application 572, secure token service 574, and a unified login server 576. Unified login server 576 includes an authentication service 578 and a unified logger 580. Before user 204 is able to access services provided by payment provider server 570, payment provider server 570 authenticates the user. Payment provider server 570 includes an authentication service 578 that is configured to communicate with user devices to authenticate users. Unified logger 580 receives payment object 530 and determines whether it includes a refresh token. In this example, payment object 530 does not include a refresh token. Accordingly, at an action 508, unified logger 580 sends a webpage (e.g., webpage 302) displaying a prompt to the user enter their user credentials and an option to consent to a unified login.

Browser 558 receives the request from unified logger 580 and renders the webpage including the prompt to enter user credentials and the option to consent to a unified login on a display of user device 550. User 204 may enter their user credentials ("Username" and "Password") and select to opt into the unified login (OptIn=True) into the user device. At an action 510, browser 558 sends a response including user credentials and the consent to the unified login to payment provider server 570.

At an action 512, authentication service 578 successfully authenticates the user. Payment provider server 570 may store the user credentials of authenticated users in database 594 and check whether any of those authenticated user credentials match the received user credentials. Authentication service 578 authenticates users attempting to access services (e.g., payment application 572) provided by payment provider server 570. Authentication service 578 validates user credentials (may be entered by users) and maintains user accounts, which include information about users, in a database 594. Payment provider server 570 is coupled to database 594, which includes a plurality of user accounts, each of which may include account information associated with consumers, merchants, and funding sources, such as credit card companies.

For example, the account information may include private financial information of device users such as account numbers, passwords, device identifiers, user names, phone numbers, credit card information, bank information, or other financial information, which may be used to facilitate online transactions by user 204. The account information may also include user purchase history and user ratings. Authentication service 578 may be further configured to determine the existence of and to manage accounts for user 204, as well as create new accounts.

In FIG. 5B, at an action 514, in response to authentication service 578 successfully authenticating the user, secure token service 574 generates an access token 588 that enables the user device to access resources protected by payment provider server 570. At an action 516, in response to response 510 including an indication that the user consents to the unified login, unified logger 580 generates a refresh token 592. Payment provider server 570 is coupled to database 594, which stores, among other data, data about user accounts, payment accounts, and unified login consents. At an action 518, unified logger 580 stores refresh token 592 into database 594 and associates the refresh token with the user's user credentials stored in database 594. At an action 520, unified logger 580 includes refresh token 592 in a cookie 596. Payment provider server 570 sends access token 588 and cookie 596, which includes refresh token 592, to user device 550. At an action 522, browser 558 receives access token 588 and cookie 596 and stores the access token and cookie in memory (e.g., browser memory).

Although user device 550 is illustrated as including two applications (e.g., merchant application 554 and browser 558), this is not intended to be limiting and user device 550 may include more than two applications. For example, user device 550 may include another merchant application that also includes SDK 556.

User device 550 also may include other applications to perform functions, such as email, texting, voice and instant messaging (IM) applications that allow user 204 to send and receive emails, calls, and texts through network 590, as well as applications that enable the user to communicate, transfer information, make payments, and otherwise use a smart wallet through the payment provider.

Figure 6:
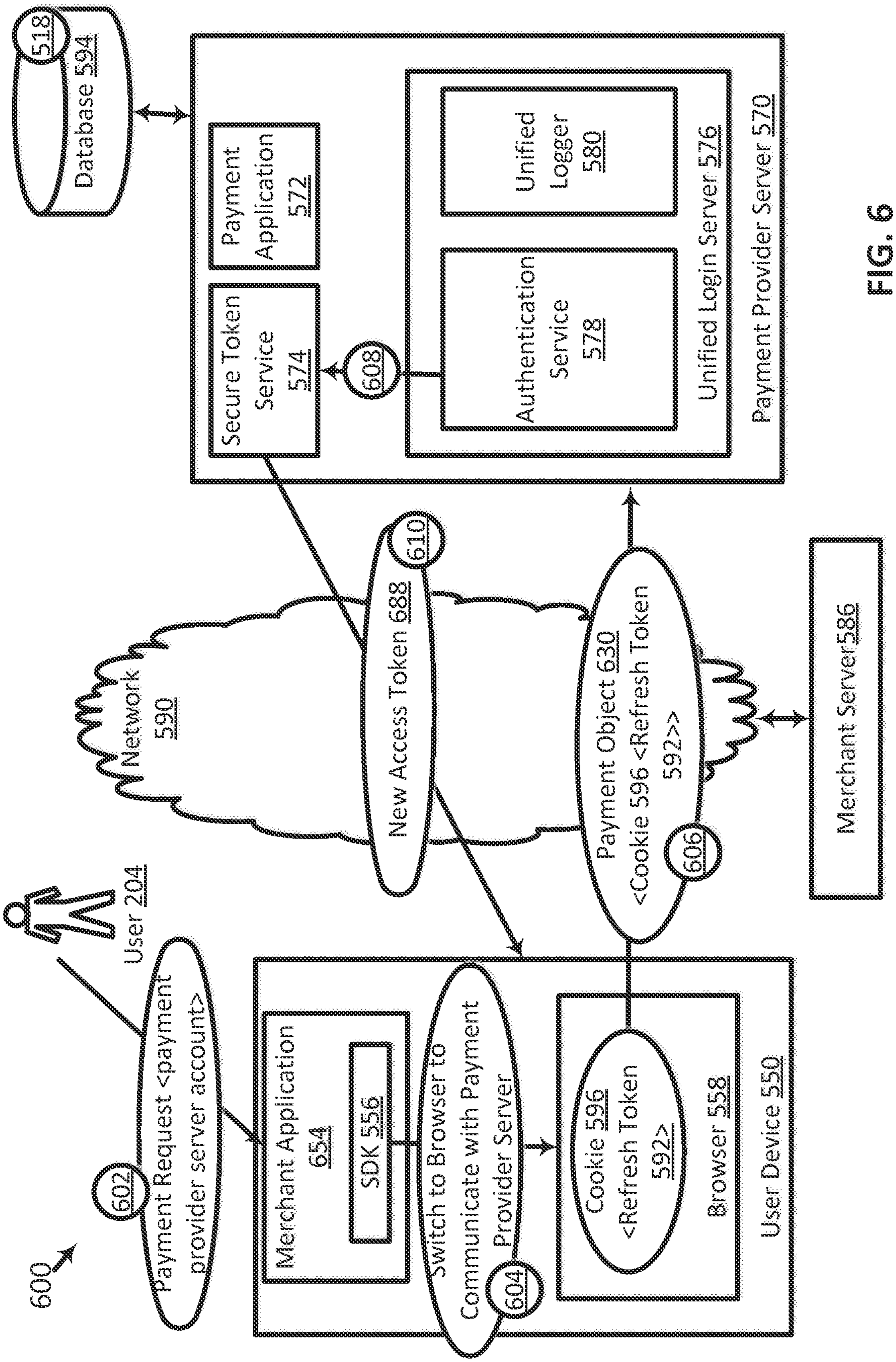
FIG. 6 is a block diagram of an example process flow of the networked system configured to implement a process for silently authenticating a user using a computing device.

FIG. 6 is a block diagram of an example process flow of a networked system 500 configured to implement a process for silently authenticating a user using a computing device. In FIG. 6, cookie 596, which includes refresh token 592, is stored in browser 558. At an action 602, user 204 may select to make a payment using an account that the user has with payment provider server 570. In FIG. 6, user device 550 includes merchant application 654 (which may be the same or different from merchant application 554 in FIG. 5A). At an action 604, in response to the selection in action 602, SDK 556 invokes an application switch to browser 558 to communicate with payment provider server 570.

At an action 606, browser 558 sends a payment object 630 including payment details of the transaction, identifying information about the client, one or more redirect URLs, and/or a scope of the transaction to payment provider server 570. Unified logger 580 receives the payment object and determines whether the refresh token included in the payment object is valid and whether the payment request is within the authorization scope of the refresh token.

At an action 608, authentication service 578 successfully authenticates the user based on the refresh token and the determination that the payment request is within the authorization scope of the refresh token. Authentication service 578 sends a message to secure token service 574 to indicate that user 204 has been authenticated. At an action 610, based on the message, secure token service 574 generates a new access token 688 and sends the new access token to the user device. The user device may then provide the new access token to authentication server 578 to authenticate the user. In this example, it is unnecessary for the user to enter their user credentials in order to receive an access token. Rather, the browser provides the payment provider server with the refresh token and this is used to obtain a new access token.

III. Revocation of a Unified Login

Figure 7:
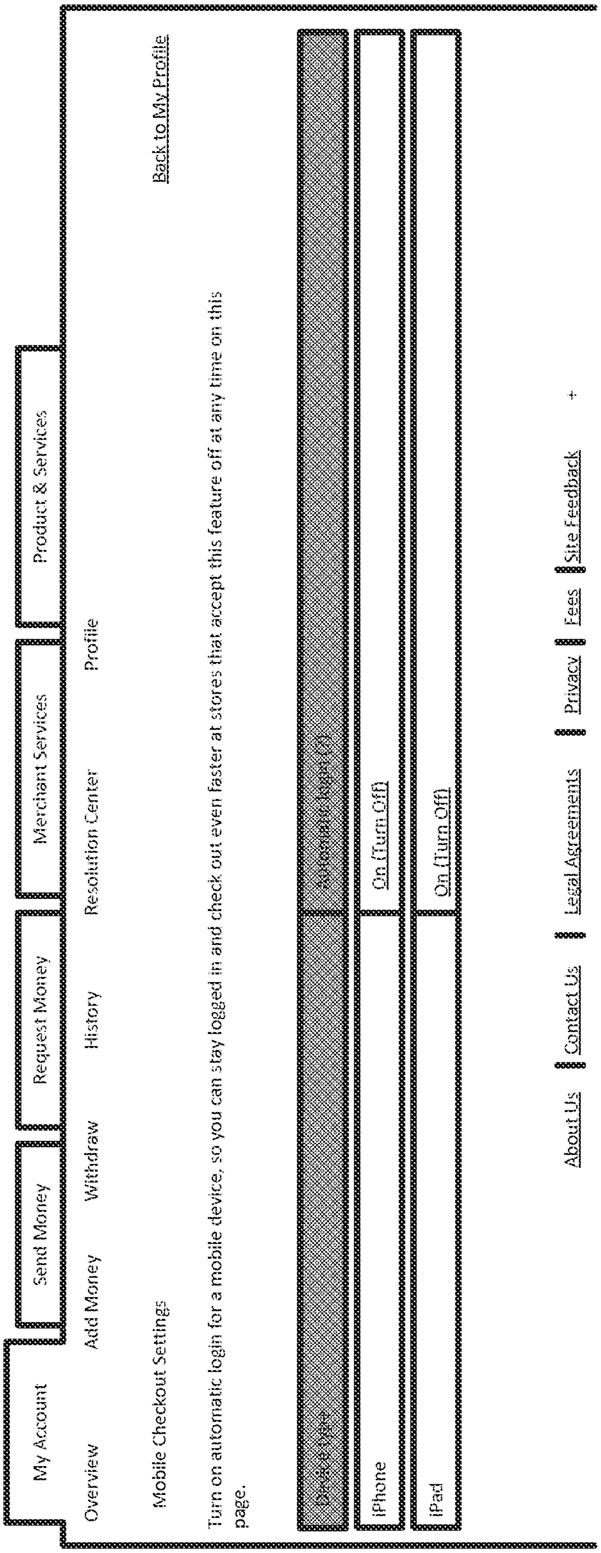
FIG. 7 provides an example webpage providing the user the option to revoke the unified login capability.

In the event the user has lost their user device, it may be desirable for the user to revoke the unified login capability on the user device. In some examples, the payment provider server provides a webpage that allows the user to select this option. FIG. 7 provides an example webpage providing the user the option to revoke the unified login capability.

IV. Additional Example Method

If the user has agreed to a consent agreement with a merchant application, the payment system may determine that the user has agreed to a unified login across any merchant application that uses the payment system for satisfying a debt. The term "debt" may refer to an amount owed or gifted. The payment system may provide the refresh token to the user device if the user has agreed to the consent agreement. The user device may receive the refresh token and store it. If the user desires to pay a merchant associated with a merchant application that uses the payment system to satisfy a debt, the user may provide a cookie including the refresh token to the payment system. The user may be silently authenticated when using any merchant application that uses the payment system to satisfy a debt.

Figure 8:
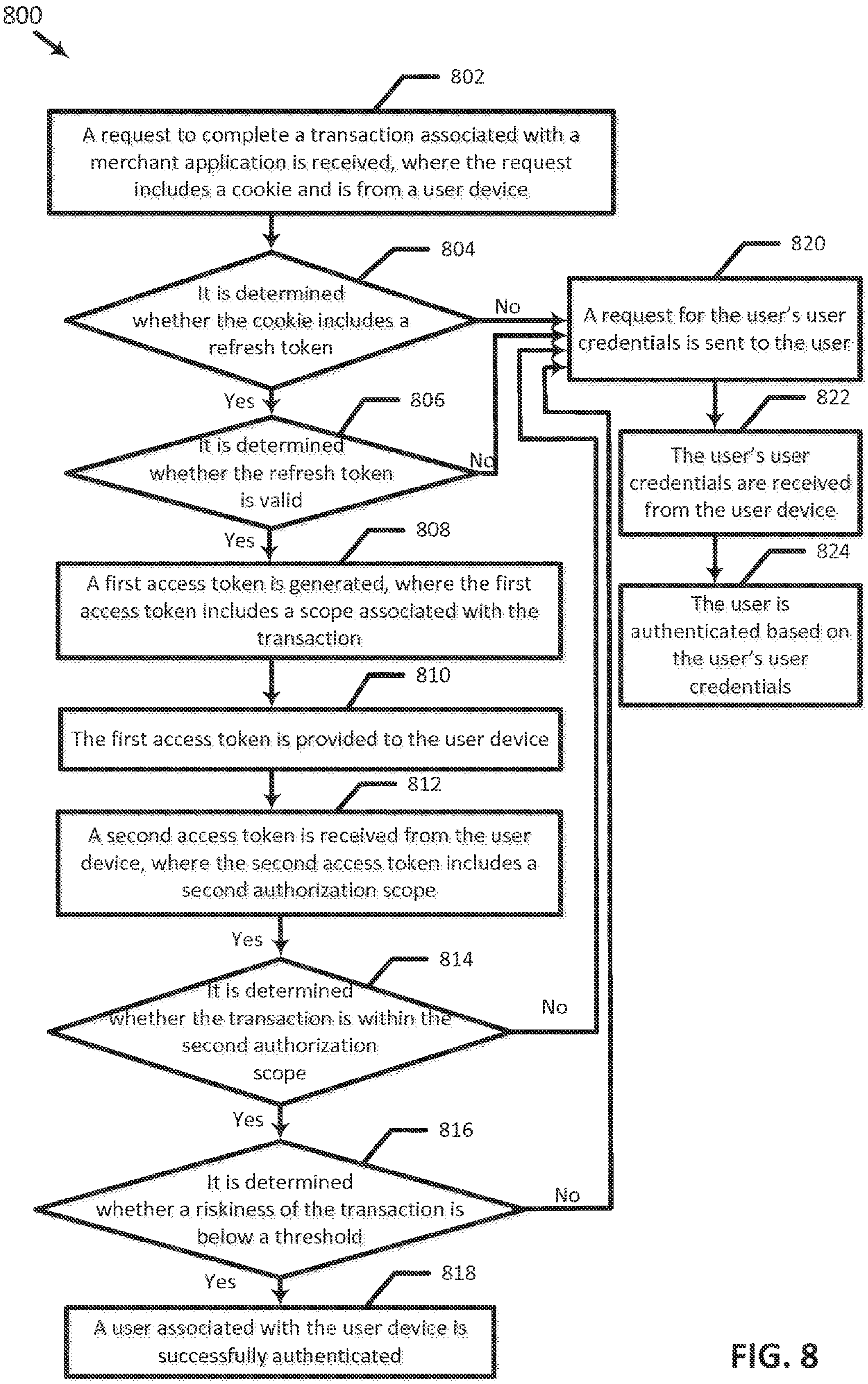
FIG. 8 is a flowchart illustrating an embodiment of a method of a payment service provider silently authenticating a user.

FIG. 8 is a flowchart illustrating an embodiment of a method 800 of a payment service provider silently authenticating a user. At an action 802, a request to complete a transaction associated with a merchant application is received, where the request includes a cookie and is from a user device. At an action 804, it is determined whether the cookie includes a refresh token. If the cookie is determined to include a refresh token, process flow proceeds to an action 806, in which it is determined whether the refresh token is valid.

If the refresh token is determined to be valid, process flow proceeds to an action 808, in which a first access token is generated, where the first access token includes a scope associated with the transaction. At an action 810, the first access token is provided to the user device. At an action 812, a second access token is received from the user device, where the second access token includes a second authorization scope. At an action 814, it is determined whether the transaction is within the second authorization scope.

If the transaction is determined to be within the second authorization scope, process flow proceeds to an action 816, in which it is determined whether a riskiness of the transaction is below a threshold. Various factors may be used to determine the riskiness of the transaction. In an example, if a location of the user device is in a country that the user does not reside in or has not visited before, the riskiness of the transaction may be higher because, for example, the user device may have been stolen. In another example, if the transaction is a purchase and is shipped to an address that is not the user's address, the riskiness of the transaction may be higher. In another example, if the transaction is a purchase for an amount that is over a particular amount the user has not purchased goods for close to this amount before, the riskiness of the transaction may be higher.

If the riskiness of the transaction is below the threshold, process flow proceeds to an action 818, in which a user associated with the user device is successfully authenticated. In this example, it is unnecessary for the user to enter the user's user credentials in order to be successfully authenticated. Rather, the payment system may successfully authenticate the user based on the second access token. For example, if the user is successfully authenticated, the payment system may provide the user with an authenticated session. In this example, the payment system authenticates the user in the authenticated session without prompting the user to provide user credentials in the authenticated session. If the riskiness of the transaction exceeds the threshold (this is a risky transaction), payment provider server 570 may turn down the access token and process flow proceeds to an action 820, which is further discussed below.

In some examples, secure token service 574 generates the first access token if the refresh token is valid. The first access token may include an authorization scope associated with the transaction. Secure token service 574 may provide the first access token to user device 550. User device 550 may provide a second access token to unified login server 576. The second access token may include a second authorization scope and is provided by the user device to authentication service 578.

In contrast, if the cookie is determined to not include the refresh token, process flow proceeds to action 820. Similarly, if the refresh token is determined to not be valid, process flow proceeds to action 820. Similarly, if the transaction is determined to not be within the second authorization scope, process flow proceeds to action 820. At action 820, a request for the user's user credentials is sent to the user. At an action 822, the user's user credentials are received from the user device. At an action 824, the user is authenticated based on the user's user credentials. The user may be successfully authenticated if the user's user credentials match user credentials that are already stored in the payment system and associated with a valid account. The user may fail authentication if the user's user credentials do not match user credentials that are stored in the payment system.

It should be understood that additional processes may be performed before, during, or after blocks 802-824 discussed above. It is also understood that one or more of the blocks of method 800 described herein may be omitted, combined, or performed in a different sequence as desired. For example, action 814 may be performed before action 806. Additionally, the access token may be generated at any point (e.g., before the determination that the refresh token is valid or after the determination that the riskiness of the transaction is below the threshold).

V. Example Computing Systems

Figure 9:
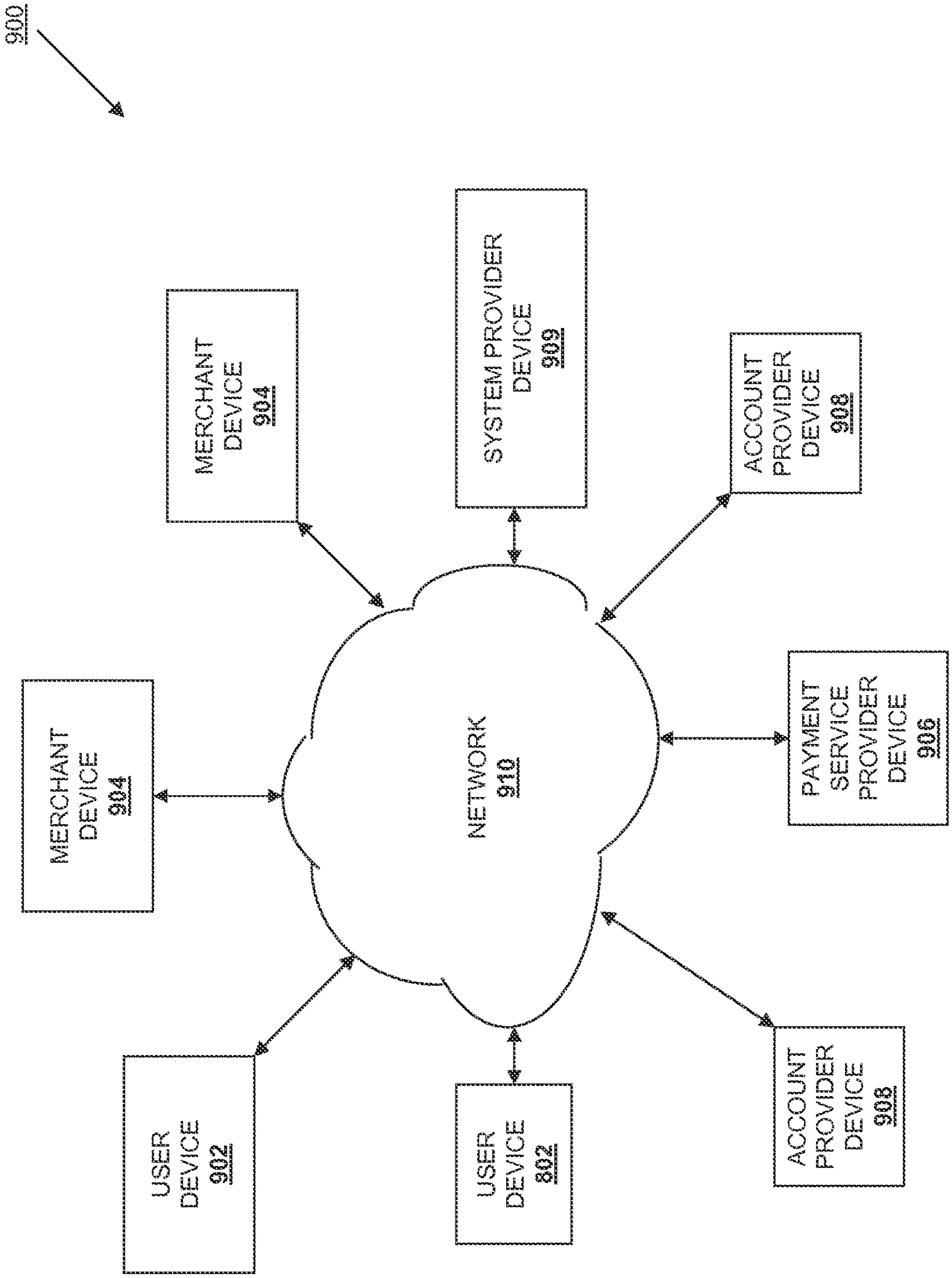
FIG. 9 is a schematic view illustrating an embodiment of a networked system.

Referring now to FIG. 9, an embodiment of a network-based system 900 for implementing one or more processes described herein is illustrated. As shown, network-based system 900 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 9 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 900 illustrated in FIG. 9 includes a plurality of user devices 902, a plurality of merchant devices 904, a payment service provider device 906, a plurality of account provider devices 908, and/or a system provider device 909 in communication over a network 910. Any of the user devices 902 may be the user devices, discussed above, and may be operated by the users discussed above. The merchant devices 904 may be the merchant devices discussed above and may be operated by the merchants discussed above. The payment service provider device 906 may be the payment service provider devices discussed above and may be operated by a payment service provider such as, for example, PayPal® Inc. of San Jose, CA. The account provider devices 908 may be the account provider devices discussed above and may be operated by the account providers discussed above such as, for example, credit card account providers, bank account providers, savings account providers, and a variety of other account providers known in the art. The system provider device 909 may be the system provider devices discussed above and may be operated by the system providers discussed above.

The user devices 902, merchant devices 904, payment service provider device 906, account provider devices 908, and/or system provider device 909 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 910.

The network 910 may be implemented as a single network or a combination of multiple networks. For example, in various embodiments, the network 910 may include the Internet and/or one or more intranets, landline networks, wireless networks, and/or other appropriate types of networks.

The user devices 902 may be implemented using any appropriate combination of hardware and/or software configured for wired and/or wireless communication over network 910. For example, in one embodiment, the user devices 902 may be implemented as a personal computer of a user in communication with the Internet. In other embodiments, the user devices 902 may be a smart phone, personal digital assistant (PDA), laptop computer, and/or other types of computing devices.

The user devices 902 may include one or more browser applications which may be used, for example, to provide a convenient interface to permit the user to browse information available over the network 910. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 902. In particular, the other applications may include a payment application for payments assisted by a payment service provider through the payment service provider device 906. The other applications may also include security applications for implementing user-side security features, programmatic user applications for interfacing with appropriate application programming interfaces (APIs) over the network 910, or other types of applications. Email and/or text applications may also be included, which allow the user to send and receive emails and/or text messages through the network 910. The user devices 902 may include one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used by the payment service provider device 906 and/or account provider devices 908 to associate the user with a particular account as further described herein.

The merchant devices 904 may be maintained, for example, by a conventional or on-line merchant, conventional or digital goods seller, individual seller, and/or application developer offering various products and/or services in exchange for payment to be received conventionally or over the network 910. In this regard, the merchant devices 904 may include a database identifying available products and/or services (e.g., collectively referred to as items) which may be made available for viewing and purchase by the user.

The merchant devices 904 may also include a checkout application which may be configured to facilitate the purchase by the payer of items. The checkout application may be configured to accept payment information from the user through the user devices 902, the account providers through the account provider devices 908, and/or from the payment service provider through the payment service provider device 906 over the network 910.

Figure 10:
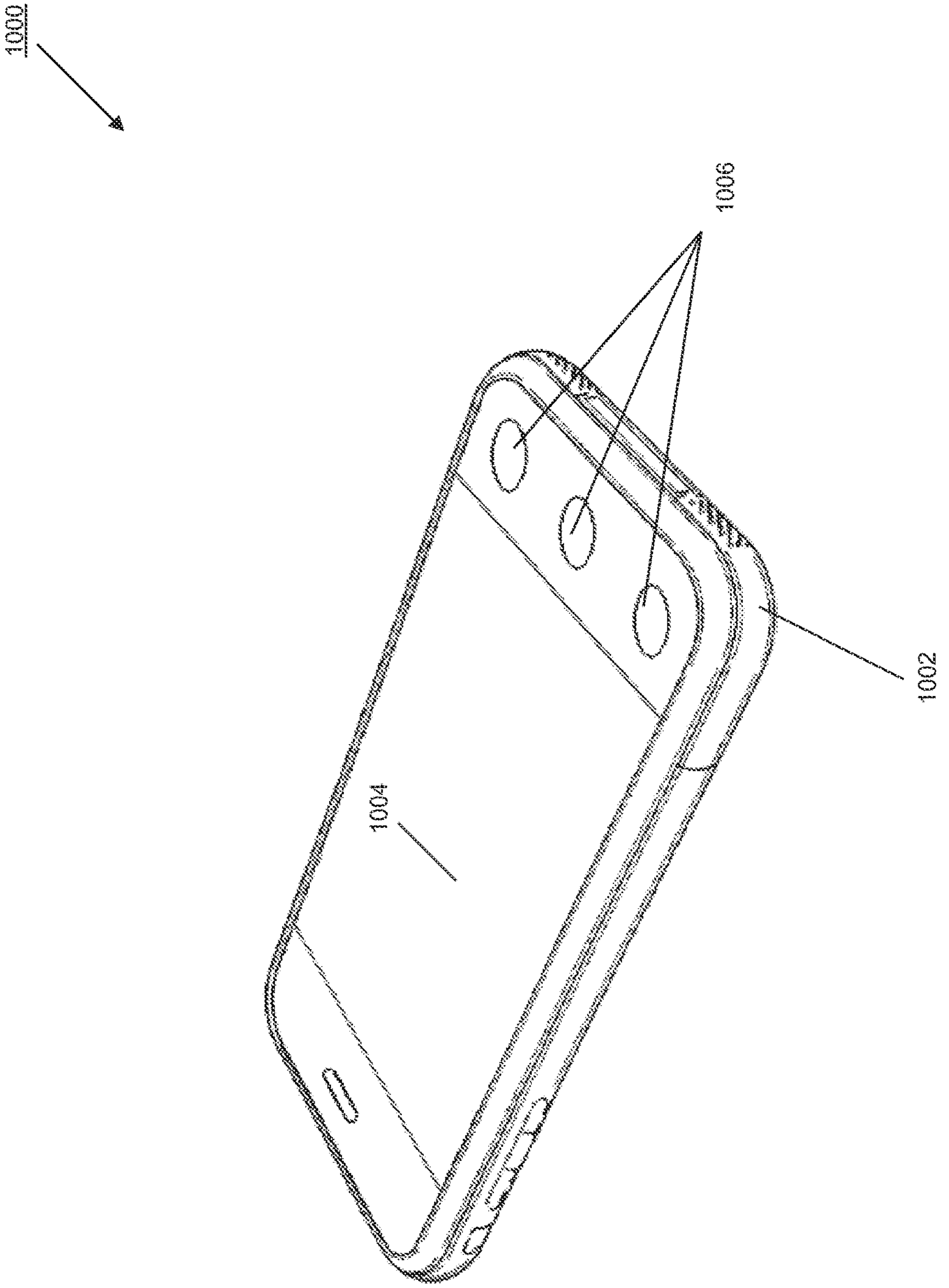
FIG. 10 is a perspective view illustrating an embodiment of a user device.

Referring now to FIG. 10, an embodiment of a user device 1000 is illustrated. The user device 1000 may be any of the user devices discussed above. The user device 1000 includes a chassis 1002 having a display 1004 and an input device including the display 1004 and a plurality of input buttons 1006. One of skill in the art will recognize that the user device 1000 is a portable or mobile phone including a touch screen input device and a plurality of input buttons that allow the functionality discussed above with reference to the method 100. However, a variety of other portable/mobile user devices and/or desktop user devices may be used in the methods discussed above with reference to FIGS. 1 and 4 without departing from the scope of the present disclosure.

Figure 11:
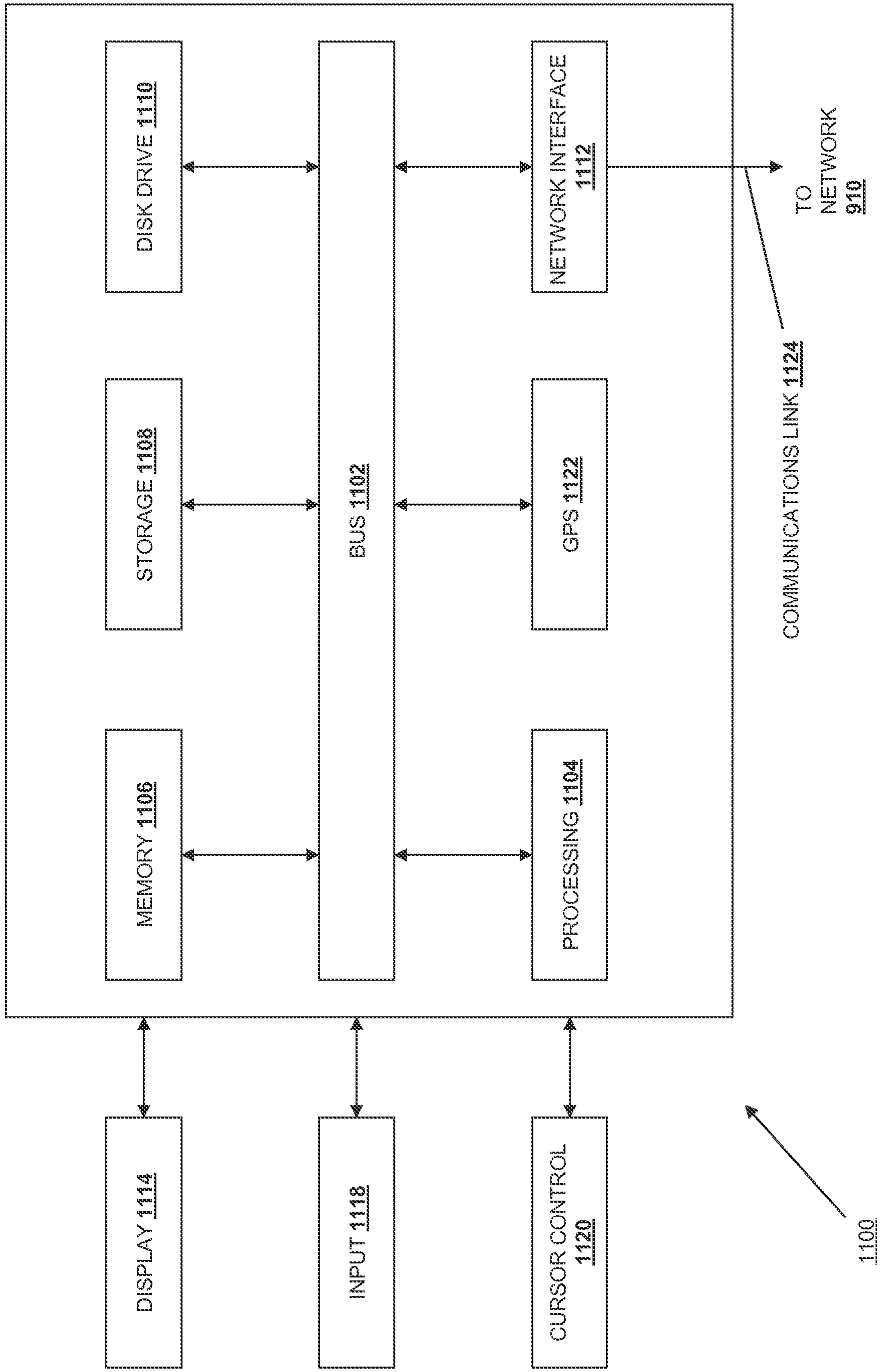
FIG. 11 is a schematic view illustrating an embodiment of a computer system.

Referring now to FIG. 11, an embodiment of a computer system 1100 suitable for implementing, for example, the user devices, the merchant devices, the payment service provider device, the account provider devices, and/or the system provider device is illustrated. It should be appreciated that other devices utilized by users, merchants, payment service providers, account providers, and/or system providers in the payment system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art.) In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the user devices, the merchant devices, the payment service provider device, the account provider devices, and/or the system provider device. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102.

In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 1110 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Figure 12:
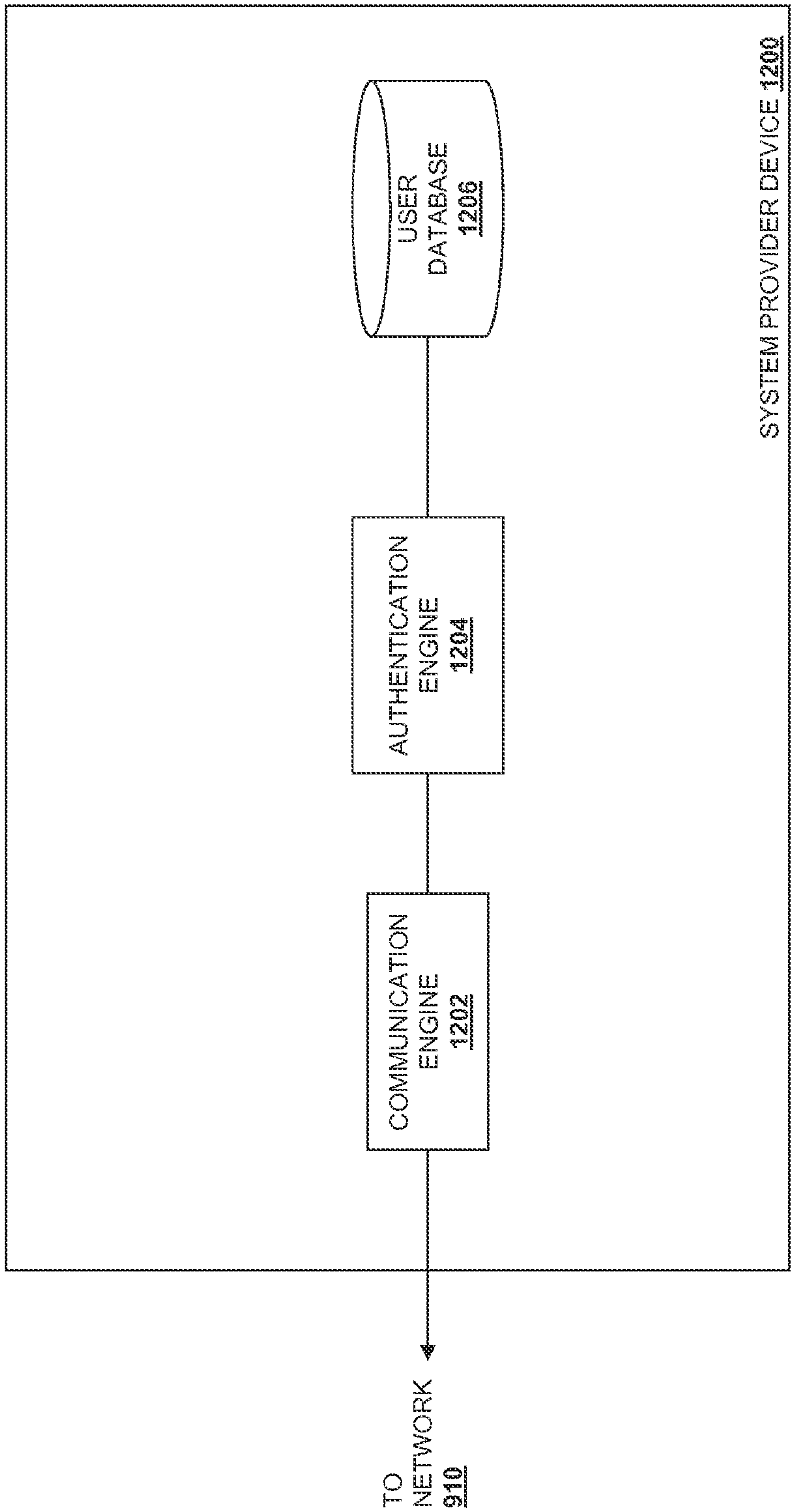
FIG. 12 is a schematic view illustrating an embodiment of a system provider device.

Referring now to FIG. 12, an embodiment of a system provider device 1200 is illustrated. In an embodiment, the device 1200 may be the user devices, the merchant devices, the payment service provider device, the account provider devices, and/or the system provider device discussed above. The device 1200 includes a communication engine 1202 that is coupled to the network 910 and to an authentication engine 1204 that is coupled to a user database 1206. The communication engine 1202 may be software or instructions stored on a computer-readable medium that allows the device 1200 to send and receive information over the network 910. The authentication engine 1204 may be software or instructions stored on a computer-readable medium that is operable to provide any of the other functionality that is discussed above. While the database 1206 has been illustrated as located in the device 1200, one of skill in the art will recognize that it may be connected to the authentication engine 1204 through the network 910 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for authenticating a user across a plurality of different applications on a user device, the method comprising:

responsive to determining that the user is authenticated for accessing a first application on the user device, generating, by a payment provider, an access token for accessing one or more resources of the payment provider by the first application;

sending, by the payment provider, the access token to the user device;

responsive to determining that the user has consented to a unified login across the plurality of different applications, generating, by the payment provider after the access token has been sent to the user device, a refresh token that is associated with user authentication credentials of the user and defines an authorization scope of transactions;

sending, by the payment provider and to the user device, the refresh token generated by the payment provider;

receiving, by the payment provider from the user device, a request for a subsequent transaction, the request comprising a refresh token received via the request;

determining, by the payment provider, whether the refresh token received via the request matches the refresh token generated by the payment provider and whether the subsequent transaction is within the authorization scope; and automatically authenticating, by the payment provider, the user for the subsequent transaction based on a determination that the refresh token received via the request matches the refresh token generated by the payment provider and that the subsequent transaction is within the authorization scope.

2. The method of claim 1, further comprising:

receiving, by the payment provider and from the user device, another request to complete the subsequent transaction associated with a second application different from the first application, the request including a refresh token received via the another request and an identifier from the user device;

determining, by the payment provider, that the refresh token received via the another request is valid and that the subsequent transaction is a first type of transaction based on the authorization scope; and authenticating, by the payment provider, the user in response to a determination that the refresh token received via the another request is valid and that the subsequent transaction is the first type of transaction.

3. The method of claim 1, wherein the user authentication credentials are received, by the payment provider, from a first merchant application of the plurality of different applications on the user device of the user.

4. The method of claim 1, wherein the sending the refresh token generated by the payment provider to the user device comprises sending a cookie that contains the refresh token generated by the payment provider.

5. The method of claim 1, further comprising:

causing a user interface of the user device to display authentication fields that are configured to receive the user authentication credentials; and causing the user interface to display an option to select the unified login separately from the authentication fields.

6. The method of claim 1, further comprising:

causing a user interface of the user device to present an option to consent to the unified login prior to the user being authenticated for accessing the first application.

7. The method of claim 1, wherein the access token is valid for a certain duration.

8. The method of claim 1, wherein the unified login is for authenticating the user for accessing the one or more resources of the payment provider from the plurality of different applications without requiring the user to provide the user authentication credentials.

9. The method of claim 1, wherein the unified login allows an automatic authentication of the user for initiating, from the plurality of different applications, transactions via the payment provider.

10. A payment provider system comprising:

a non-transitory memory storing instructions; and a processor configured to execute the instructions to cause the payment provider system to:

determine that a user is authenticated, based on user credentials of the user, for accessing a first application on a user device, provide an access token to the user device, wherein the access token is generated based on the user being authenticated for accessing the first application, wherein the access token allows access of one or more resources of the payment provider system by the first application;

determine that the user has consented to a unified login across a plurality of applications on the user device;

based on a determination that the user has consented to the unified login across the plurality of applications on the user device and after the access token has been sent to the user device, generate a refresh token that is different from the access token, wherein the refresh token is associated with user authentication credentials of the user and defines an authorization scope of subsequent transactions;

provide the refresh token to the user device; and based on a request from a second application of the plurality of applications to access the one or more resources of the payment provider system, authenticate the user for accessing the one or more resources of the payment provider system by the second application based on the request comprising the refresh token and being within the authorization scope associated with the refresh token.

11. The payment provider system of claim 10, wherein executing the instructions further causes the system to, determine that the refresh token is valid and that the second application that is different from the first application is authorized based on the authorization scope.

12. The payment provider system of claim 10, wherein the user authentication credentials are received, by the payment provider system, from the first application on the user device of the user.

13. The payment provider system of claim 10, wherein the refresh token is provided to the user in a cookie.

14. The payment provider system of claim 10, wherein executing the instructions further causes the system to, cause a user interface of the user device to display authentication fields that are configured to receive the user authentication credentials; and cause the user interface to display an option to select the unified login separately from the authentication fields.

15. The payment provider system of claim 10, wherein the unified login enables authenticating the user to the resources of the payment provider system from the plurality of applications without requiring the user to provide the user authentication credentials.

16. A non-transitory machine-readable medium having instructions stored thereon, the instructions executable to cause performance of operations comprising:

determining that a user is authenticated, based on user credentials of the user, for accessing a merchant application on a user device;

providing an access token to the user device, wherein the access token is generated based on the user being authenticated for accessing the merchant application, wherein the access token facilitates processing of transactions by a payment provider system for the transactions initiated by the merchant application;

determining that the user has consented to a unified login across a plurality of merchant applications, including the merchant application, on the user device;

providing a refresh token to the user device after the access token has been provided to the user device, wherein the refresh token is generated after the access token was generated and is based on the user consenting to the unified login, wherein the refresh token is associated with user authentication credentials of the user and defines an authorization scope of subsequent transactions;

receiving a request for a subsequent transaction, the request comprising the refresh token; and based on a determination that the subsequent transaction is within the authorization scope associated with the refresh token, authenticating the user for the subsequent transaction.

17. The non-transitory machine-readable medium of claim 16, wherein the user authentication credentials are received, by the payment provider system, from the merchant application on the user device of the user.

18. The non-transitory machine-readable medium of claim 16, wherein the access token is valid for a certain duration.

19. The non-transitory machine-readable medium of claim 16, wherein the operations further comprise:

causing a user interface of the user device to present an option to consent to the unified login prior to the user being authenticated for accessing the merchant application.

20. The non-transitory machine-readable medium of claim 16, wherein the unified login enables automatic authentication of the user to initiate, from the plurality of merchant applications, transactions via the payment provider system.

* * * * *